March 21, 1944. E. A. SCHRYBER 2,344,790
MANUFACTURE OF FINNED TUBING AND THE LIKE
Filed March 11, 1943 2 Sheets-Sheet 2
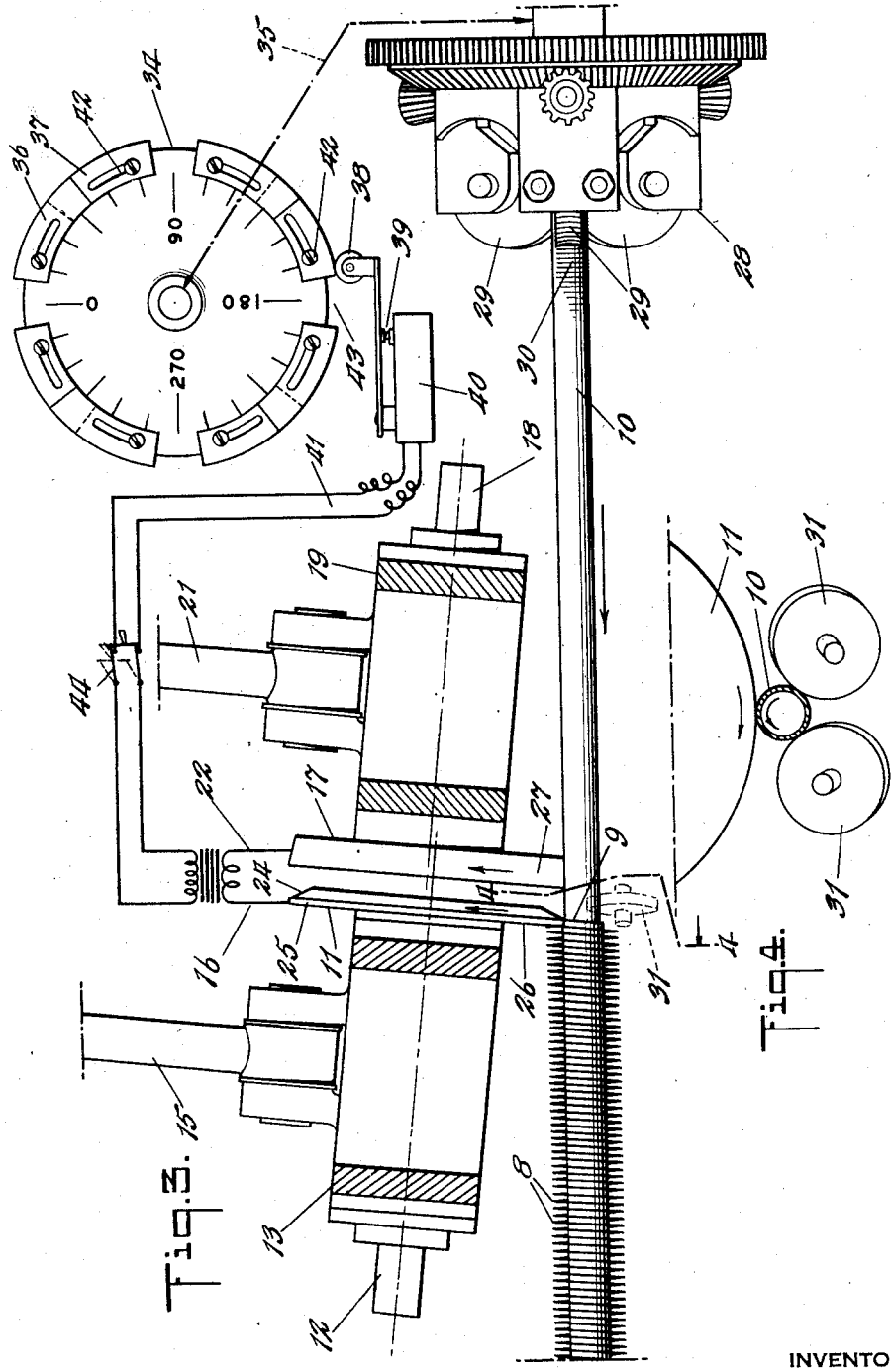
INVENTOR
EMIL A. SCHRYBER
BY
ATTORNEY Patented Mar. 21, 1944

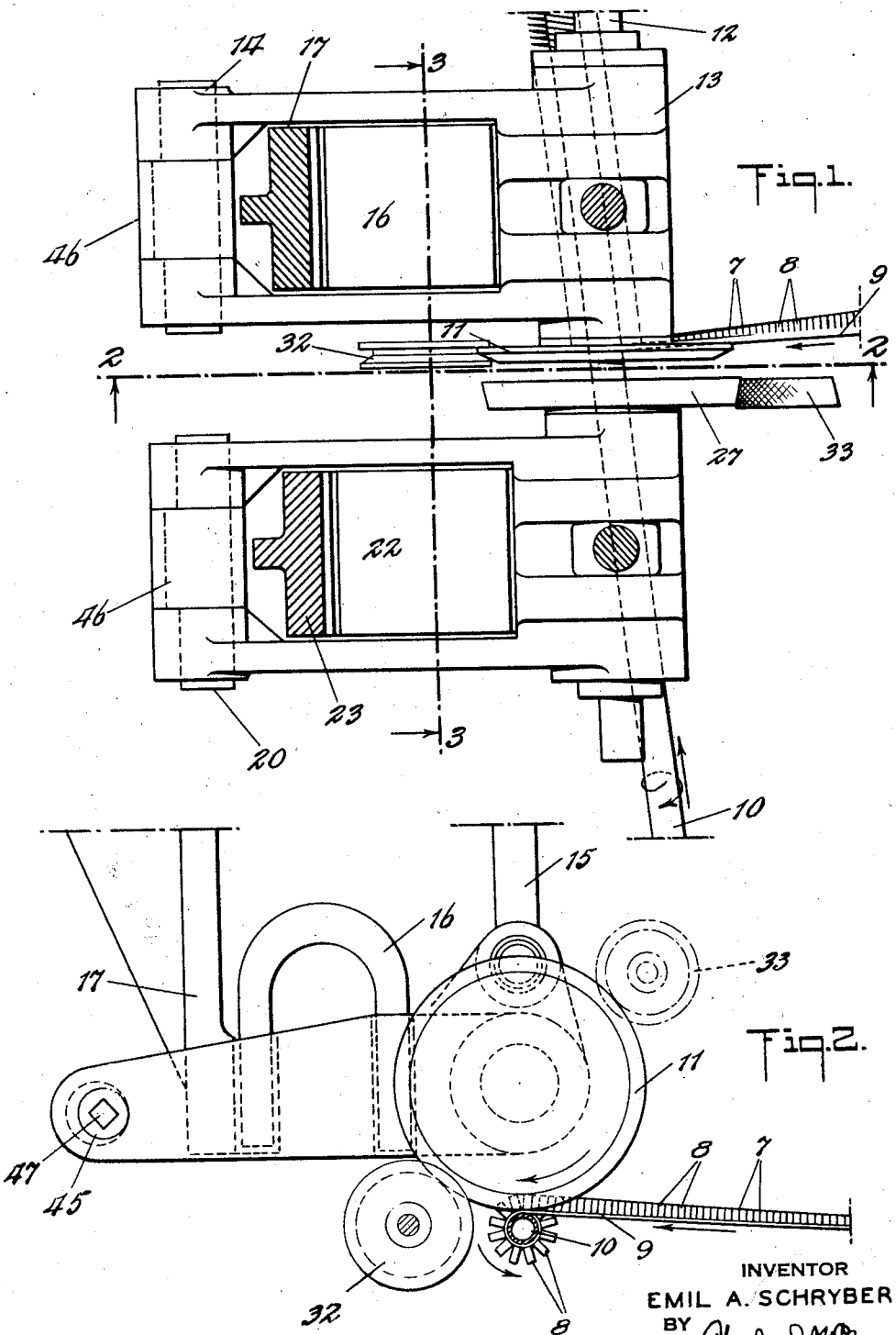

2,344,790

UNITED STATES PATENT OFFICE 2,344,790

MANUFACTURE OF FINNED TUBING AND THE LIKE

Emil A. Schryber, Lynbrook, N. Y., assignor to Tilco-Fin, Inc., Brooklyn, N. Y., a corporation of New York Application March 11, 1943, Serial No. 478,815

9 Claims. (Cl. 219—4)

The invention herein disclosed relates to the manufacture of finned tubing, particularly such as disclosed in the Edwin F. Tilley Patent 1,932,-610 of October 31, 1933.

In the Tilley Patent 2,251,642 of August 5, 1941, a machine is disclosed for applying the fin material by slitting a strip inward from one edge to outline separate fins attached to a continuous web and then, while turning up the fins, winding this web helically onto the rotating and longitudinally advancing tubing. In that machine and under the method of that patent, the web or base strip as it was called, was secured to the tubing by a soldering operation.

The present invention involves mechanism for and a method of securing the web to the tubing, pipe, rod or other core center by a welding operation and the general objects of the invention are to provide a method and mechanism for accomplishing this in the most practical and efficient manner possible.

Particular objects of the invention are to assure firm, positive and tight laying on of the base strip and the welding of the same to the core element, the effecting of the weld continuously and as a part of the strip coiling operation, without slowing down or interfering with the fin applying operation and without in any way injuring or otherwise affecting thin walled tubing or other stock to which the fin strip is being applied.

A further special object of the invention is to facilitate and economize manufacture of the finned tubing in predetermined desired lengths.

Other desirable objects and the novel features of invention will appear and are set forth in the following specification.

The drawings accompanying and forming part of the specification illustrate present preferred commercial embodiments of the invention. Structure and method however may be modified and changed as regards this disclosure, all within the true intent and broad scope of the invention as hereinafter defined and claimed.

Fig. 1 in the drawings is a fragmentary and part sectional plan view illustrating parts of the machine employed in applying the fin strip.

Fig. 2 is a horizontal sectional view on substantially the plane of line 2—2 of Fig. 1, showing the web of the strip passing beneath the electrode roll.

Fig. 3 is a vertical sectional view of the machine on substantially the plane of line 3—3 of Fig. 1 and illustrating diagrammatically a form of automatic control for the welding current.

Fig. 4 is a fragmentary cross-sectional detail as on substantially the plane of line 4—4 of Fig. 3.

In Figs. 1 and 2, the fin strip is shown coming in at the right, slitted inward from one edge at 7, to form separate tongues or fins 8, connected continuously together by a web or base strip 9, constituting the opposite edge portion of the full width strip. These views also show how the slit fin portion of the strip is gradually turned up, as it approaches the tubing 10, or core to which it is being applied, to stand out substantially at a right angle to the base portion 9.

At the line of contact with the core, an electrode wheel 11, presses the base strip firmly down on the core, said wheel as shown in Fig. 1, rotating on an axis 12, inclined to the axis of tubing 9, in substantial correspondence with the pitch angle at which the strip is being coiled on the tubing. The axle carrying this electrode is shown journalled in the arms of a yoke 13, pivoted at 14, and shiftable toward or away from the tubing by a piston rod 15, operating in a pressure cylinder (not shown) which may be pivotally supported to accommodate the arcuate travel of the yoke end.

A lead or other flexible strap 16, is indicated extending from one secondary terminal 17, of the welding transformer (not shown) to the portion of the bracket carrying the electrode wheel 11.

Adjoining the rotary electrode 11, is shown a second electrode wheel 17, carried by axle 18, in a second bracket 19, pivoted at 20, and actuated by piston rod 21, operating in an air or other pressure cylinder.

Similarly, the second electrode wheel is shown connected by flexible loop 22, with the other secondary terminal 23.

The rotary electrodes are specially shaped to carry the welding current to and through the base strip 9, and into and through the wall of the tubing.

The first electrode is shown as bevelled at one face at 24, down to a narrow rim portion 25, bearing on approximately the full width of the narrow base strip 9. The opposite face of this wheel is shown plane and flat at 26, to run free and clear of the upstanding fins 8.

The other electrode wheel is shown as having a slightly conical rim 27, which may be relieved slightly at the center to make full firm engagement on top of the tubing closely adjacent the strip laying electrode.

Fig. 3 shows a portion of the special chuck disclosed in Tilley Patents 2,251,642 and 2,316,117 of Aug. 5, 1941, and April 16, 1943, and comprising a rotating head structure 28, carrying radially disposed worm gears 29, which turn and advance the tubing as the head rotates.

The teeth of these worm gears, gripping the tubing under pressure, tend to form small transverse cuts and ridges 30, in the surface of the tubing. These slight projections are of advantage in effecting a firm mechanical interlock with the base strip and in assuring effective electrical conductivity between the strip and tubing.

While contemplated that electrodes may be located more or less diametrically opposite so that one may compensate the pressure of the other, it has been found that for most purposes better welding current conditions are attained by locating one welding wheel closely alongside the other. In this arrangement, where pressure of both electrodes is against the same side of the tubing, the latter may be supported at the opposite side by rolls 31, angled as shown in Fig. 4, to form a rolling cradle for the rotating and advancing tubing.

The electrode wheels may simply track the tubing or be positively driven. Thus as shown in Fig. 2, a positively driven roll 32, grooved to fit over the rim of the electrode 11, may be provided and similarly, a positively driven roll 33, engaging electrode 17. These drive rolls may be knurled or roughened to sufficiently grip the electrode wheels and they may be driven through an adjustable differential gear set so as not to force or to retard the work.

In commercial operations, it is found most practical and economical to apply the heat exchange fin continuously, in certain definite lengths. Where shorter lengths of finned tubing are desired, instead of putting short lengths through the machine, with consequent disadvantages of stopping and starting and the like, the present invention contemplates wrapping the fin strip, the continuously full length of the tube, but discontinuing the welding at those points where the finned tubing is to be subdivided.

This is accomplished by an automatic form of control, such as illustrated in Fig. 3, synchronized with the tube feeding mechanism, so as to hold the welding current on for the desired lengths of finned tubing and to discontinue the welding current at the ends of such predetermined lengths.

This control mechanism consists in the illustration of a cam wheel 34, driven at reduced speed by connections 35, from the rotating feed chuck 28, and carrying adjustable cam segments 36, 37, operable on a roller 38, to close and open a switch 39, governing operation of a relay represented at 40, controlling the primary circuit 41, of the welder.

The cam segments are shown as secured in relatively extensible relation on the cam disc by slot and screw mountings 42. The adjustability of these parts may be such as to control continuity or discontinuity of the cam surface for practically the entire 360° of rotation. Then by driving this cam disc, one revolution for a predetermined forward feed movement of tube, for instance, 20 feet, the segments can be adjusted according to degree or distance markings on the disc to accomplish the exact lengths of weld-on and weld-off portions of extended surface tubing.

For example, with a known 20 foot forward feed of tubing for one revolution of the cam disc, one inch of feed will correspond to 1½° on the cam. A cam portion made up of segments 36, 37, expanded or contracted to 27° accordingly will effect a weld 18" long. With the space such as 43, between the cams, say 9°, an unwelded tube length of 6" will automatically follow the 18" of welding. This then will provide a finished welded tube length of 18" with 6" of unwelded fin at the end of the same, which when the tube is cut at the center of the unwelded portion, will leave finned tube lengths with 3" of unwelded fin at each end. This excess unwelded fin material can be easily broken or cut away from the welded portions.

In addition to the automatic timing switch, a manually operable on and off switch may be interposed in the control circuit, as indicated at 44. The tubes from the mill may vary in length, to an extent which may throw the apportionment of welded and unwelded tubing out of order. Then if it is seen on the dial that the welding will not come out as planned, this switch may be thrown to permit the remainder of the tube to come out of the machine with the remaining portion of the extended surface unwelded.

Preferably also the drive connections for the control cam will include a "slip friction" clutch which can be moved by the operator at any time, without disturbing the synchronous drive relation, such as to set the dial back to zero at the start of each tube or to reset the dial, for instance, to extend or to diminish a length of welded or unwelded tube. By proper adjustment of the arcuate sections, the cam can be set to produce unequal as well as all equal lengths of welded and unwelded tube.

The invention makes it possible to produce extended surface tubing, rod or the like, rapidly and economically in ferrous as well as any other metals that can be united by resistance welding. By proper control of the welder, the weld may be continuous or substantially so, or may be made as a succession of spot welds, the latter being practical because of the pressure with which the strip is applied to the core. The electrodes, if driven, as by the differential drive connections above mentioned, will preferably have speed control means by which the surface speed of the electrodes can be made to match the surface speeds at the points of contact or to be greater or less than the same, as may be desired.

The relation of the combined winding on and strip welding mechanism to the feed chuck is indicated only generally, as in practice, these may be so combined as to carry the welded strip as close as need be to the final end of the tubing. Some indicating or signalling means such as differently colored lights may be provided to indicate to the operator the welding and non-welding periods in the action of the machine.

To enable the electrode wheels being accurately set to apply the pressure and welding current at the proper point for best results, the pivotal mountings 14, 20, for the electrode carrying yokes are shown as having eccentric portions 45, which, when these bearing pins are turned in their supports 46, as by means of the squared ends 47, will shift the yokes bodily toward or away from the tubing and thus advance or retard the welding point.

The welding of the continuous edge portion of the strip to the tube provides an integral bond assuring high thermal efficiency and enabling the extended surface tubing to be used under all heat, cold and acid conditions wherever the component base metals can be employed.

What is claimed is:

1. In the manufacture of extended surface tubing or the like, the combination with means for rotating and longitudinally advancing the tubing or the like, of an electrode rotating on an axis inclined with respect to the axis of said tubing or the like and having a narrow rim portion to bear on the narrow unslitted edge portion of a strip which has been transversely slitted inward from the opposite edge to form fins, a companion rotary electrode bearing on the tubing or the like, adjacent the first electrode, means for supplying welding current to said electrodes and means for thrusting said electrodes under pressure against said fin strip and tubing or the like.

2. In the manufacture of extended surface tubing or the like, the combination with means for rotating and longitudinally advancing the tubing or the like, of an electrode rotating on an axis inclined with respect to the axis of said tubing or the like and having a narrow rim portion to bear on the narrow unslitted edge portion of a strip which has been transversely slitted inward from the opposite edge to form fins, a companion rotary electrode bearing on the tubing or the like, adjacent the first electrode, means for supplying welding current to said electodes, mean for thrusting said electrodes under pressure against said fin strip and tubing or the like, said means for supplying welding current including a circuit controller synchronously driven from said rotating and advancing means and adjustable to predetermine supply of welding current only to predetermined lengths of the fin material applied to the tubing or the like.

3. In the manufacture of extended surface tubing or the like, the combination with means for rotating and longitudinally advancing the tubing or the like, of an electrode rotating on an axis inclined with respect to the axis of said tubing or the like and having a narrow rim portion to bear on the narrow unslitted edge portion of a strip which has been transversely slitted inward from the opposite edge to form fins, a companion rotary electrode bearing on the tubing or the like, adjacent the first electrode, means for supplying welding current to said electrodes, means for thrusting said electrodes under pressure against said fin strip and tubing or the like, said means for supplying welding current including a circuit controller operating in synchronism with the forward feed of the tubing or the like and having mechanism to predetermine current-on and current-off conditions at the electrodes.

4. In the manufacture of extended surface tubing or the like, the combination with means for rotating and longitudinally advancing the tubing or the like, of an electrode rotating on an axis inclined with respect to the axis of said tubing or the like and having a narrow rim portion to bear on the narrow unslitted edge portion of a strip which has been transversely slitted inward from the opposite edge to form fins, a companion rotary electrode bearing on the tubing or the like, adjacent the first electrode, means for supplying welding current to said electrodes, means for thrusting said electrodes under pressure against said fin strip and tubing or the like, said current supply means including a member driven in correspondence with the drive of the tubing or the like adjustable cam segments carried by said member and a circuit controller operable by said cam segments.

5. In the manufacture of extended surface tubing or the like, the combination with means for rotating and longitudinally advancing the tubing or the like, of an electrode rotating on an axis inclined with respect to the axis of said tubing or the like and having a narrow rim portion to bear on the narrow unslitted edge portion of a strip which has been transversely slitted inward from the opposite edge to form fins, a companion rotary electrode bearing on the tubing or the like, adjacent the first electrode, means for supplying welding current to said electrodes, means for thrusting said electrodes under pressure against said fin strip and tubing or the like and means for positively driving one or both said electrodes independently of the rotating medium engaged thereby.

6. In the manufacture of extended surface tubing or the like, the combination with means for rotating and longitudinally advancing the tubing or the like, of an electrode rotating on an axis inclined with respect to the axis of said tubing or the like and having a narrow rim portion to bear on the narrow unslitted edge portion of a strip which has been transversely slitted inward from the opposite edge to form fins, a companion rotary electrode bearing on the tubing or the like, adjacent the first electrode, means for supplying welding current to said electrodes, means for thrusting said electrodes under pressure against said fin strip and tubing or the like, yokes in which said electrodes are pivotally mounted and bearings for said yokes eccentrically adjustable for shifting one or both said electrodes to accurately set the line of contact with the material engaged thereby.

7. In combination, means for helically winding extended surface strip on a tube and including a rotary electrode bearing on the extended surface strip opposite the point of winding-on engagement of the strip with the tube, said electrode being journalled on an axis supporting the same at an angle substantially corresponding to the pitch angle of the helically wound strip, a second similarly disposed rotary electrode engaging the tube at a point adjacent the first electrode, means for supplying welding current to said electrodes and means for holding said electrodes in proper engagement with the fin strip and tube.

8. In combination, means for rotating and applying a helically wound strip of fin material to tubing and including a rotary electrode bearing on the helically applied strip substantially at the line of engagement of said strip with the tubing, and means for supplying welding current to said electrode including a timer operating in correspondence with the drive of the tubing and including means adjustable to predetermine welding and non-welding of certain lengths of strip applied to the tubing.

9. Apparatus for helically applying a narrow strip having upstanding fins to rotating and longitudinally advancing tubing and comprising a rotary electrode wheel having a narrow rim substantially corresponding to said narrow strip and journalled on an incline substantially corresponding to the pitch angle of the helically applied strip, said electrode being inclined away from the upstanding fins of said strip and thereby clear of engagement therewith, a second electrode engaging the tubing at a point alongside the first electrode and means for conducting welding current to said electrodes.

EMIL A. SCHRYBER.